United States Patent [19]

Maplethorpe et al.

[11] 4,386,787
[45] Jun. 7, 1983

[54] SPHERICAL VEHICLE

[76] Inventors: Clifford Maplethorpe, 2727 N. 32 St., Phoenix, Ariz. 85008; Kenneth E. Kary, 1221 N. 58 Pl., Scottsdale, Ariz. 85254

[21] Appl. No.: 168,005

[22] Filed: Jul. 14, 1980

[51] Int. Cl.³ ............................................. A63G 29/02
[52] U.S. Cl. ........................................ 280/206; 180/10
[58] Field of Search .............. 280/205, 206, 207, 208, 280/78; 180/10, 21; 9/310 R, 310 F, 310 G

[56] References Cited

U.S. PATENT DOCUMENTS

| 514,612 | 2/1894 | Armistead | 280/207 |
|---|---|---|---|
| 1,309,928 | 7/1919 | Wolfard | 180/10 |
| 1,915,886 | 6/1933 | Gutierrez | 180/10 |
| 2,009,904 | 7/1935 | Purves | 180/10 |
| 2,267,254 | 12/1941 | Reilley | 180/21 |
| 2,838,022 | 6/1958 | Wilson | 9/310 G |
| 3,013,806 | 12/1961 | Boyd | 280/207 |
| 3,380,755 | 4/1968 | Pound | 280/207 |
| 3,428,015 | 2/1969 | Cloud | 280/78 |
| 3,762,744 | 10/1973 | Sidlauskas | 280/207 |
| 3,905,323 | 9/1975 | Kacere | 280/206 |
| 4,102,542 | 7/1978 | Pirre et al. | 280/207 |

FOREIGN PATENT DOCUMENTS 346450 12/1921 Fed. Rep. of Germany ...... 280/207

Primary Examiner—Joseph F. Peters, Jr.
Assistant Examiner—Ross Weaver
Attorney, Agent, or Firm—Harry M. Weiss

[57] ABSTRACT

This disclosure relates to a spherical vehicle which incorporates an internally mounted rotatable seat, an observation apparatus to permit an occupant at least a view of his prospective path of travel and a drive apparatus having a pedes contact surface to serve as a device to space the occupant from a supporting medium so that he can be transported thereover.

1 Claim, 11 Drawing Figures

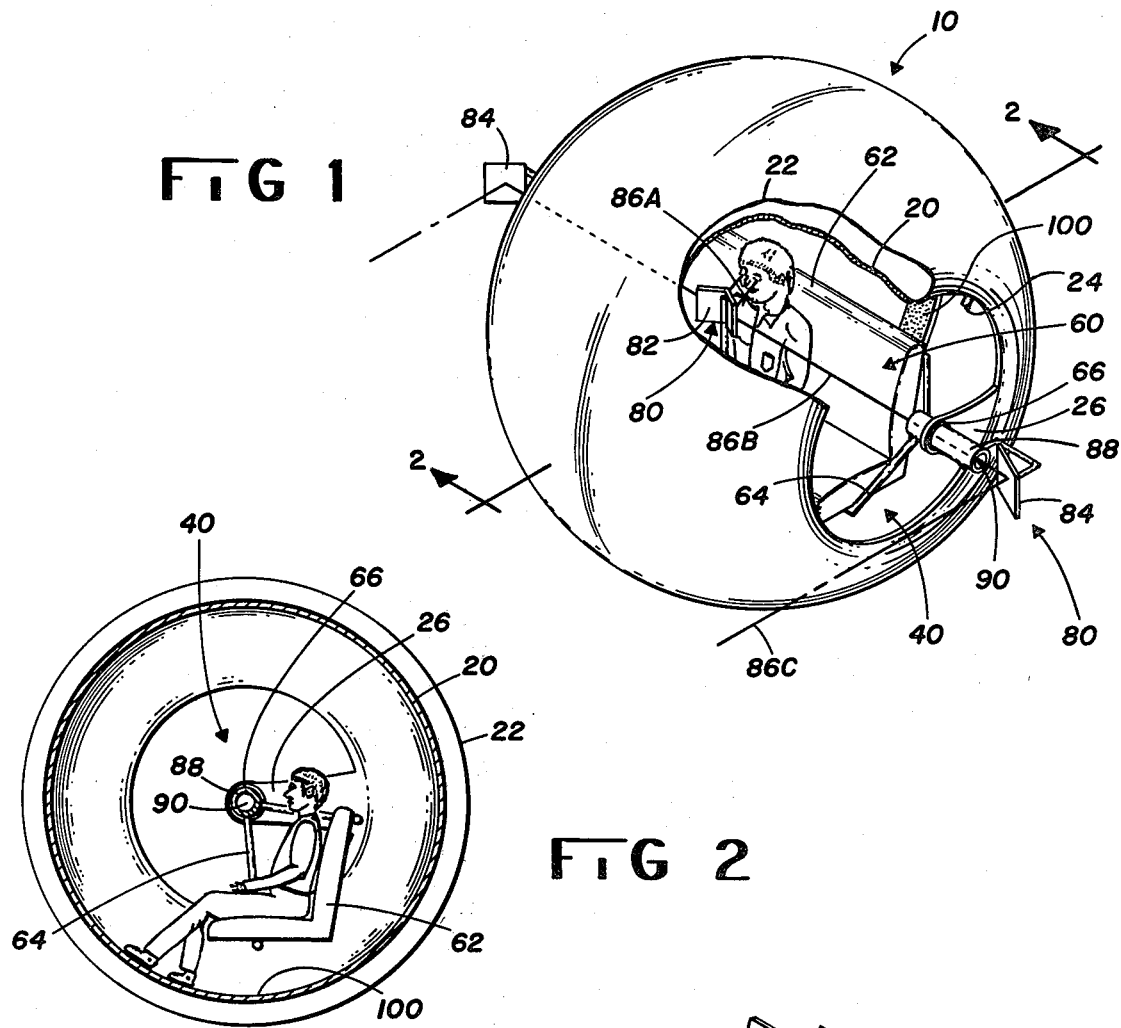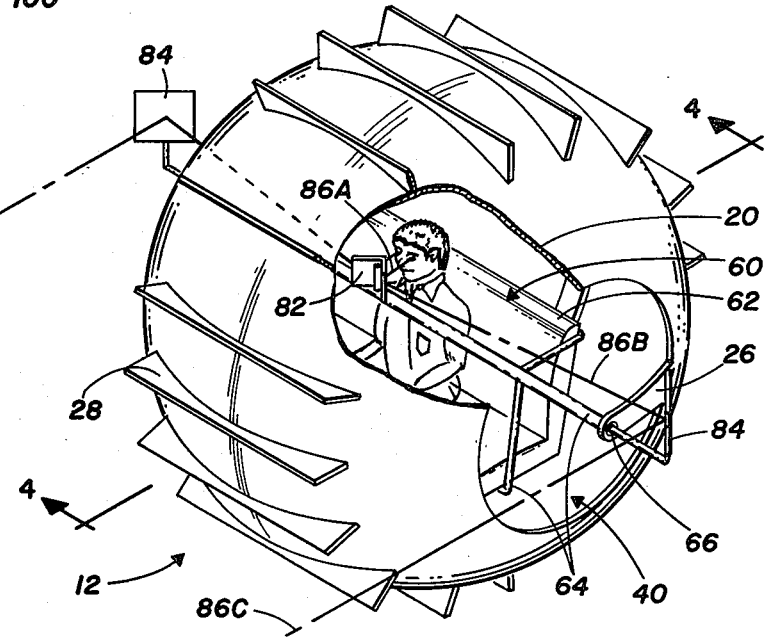

SPHERICAL VEHICLE

BACKGROUND OF THE INVENTION

1. Field of the Invention

This invention relates generally to vehicles, and, more specifically, to generally spherical vehicles incorporating an internal rotatably mounted seat, an apparatus to permit the rider to observe his path of travel, and a drive apparatus.

2. Description of the Prior Art

In the past, various spherical vehicles have been patented. U.S. Pat. No. 2,267,254, issued to J. E. Reilley on Dec. 23, 1942 disclosed a spherical vehicle provided with an outer shell, an inner platform revolvably mounted to the outer shell, an internal combustion engine driven wheel drivably communicating with the interior of the outer shell, an operator controlled shifting weight for steering the vehicle when in motion, brake shoes controllably coupled to a brake pedal and positioned to decelerate the shell by contacting the inner surface of the shell, and periscopic means to permit the operator external vision from within the shell, among other features. The apparatus disclosed by this patent was unworkably complex.

U.S. Pat. No. 3,428,015, issued to Samuel E. Cloud on Feb. 18, 1969 discloses another spherical vehicle, which is provided with a series of inflatable tubes which form an outer shell. The apparatus is also shown to be useful for transport by having the operator stand within the shell and move the shell by a forward walking movement. However, the apparatus discloses no provision to permit the operator to see, or otherwise percieve, his prospective or retrospective paths of motion, and provides no structure to permit the operator to be seated.

U.S. Pat. No. 2,838,022, issued to Wayne E. Wilson on June 10, 1958 discloses a spherical water craft, provided with complex hatch devices to seal the inlet tubes, a transparent outer shell to permit the operator to see, and a series of paddles coupled to the exterior of the shell to provide "traction" in the water as the operator rotates the shell by engaging in a walking motion on the interior surface of the shell. However, the apparatus makes no provision for permitting the operator to be seated.

A need existed for a spherical vehicle, for transportation and recreation use, which as was not overly complex, was provided with shell having a generally arcuate exterior surface, a carriage to permit the occupant to be seated, an observation apparatus to permit the operator to perceive at least his prospective path of motion, (and preferably even his retrospective path of motion), and a drive apparatus or mechanism which would permit the operator to propel the vehicle.

BRIEF DESCRIPTION OF THE DRAWING

FIG. 1 is a perspective elevational view of a first embodiment of the disclosed spherical vehicle, with portions removed for clarity.

FIG. 2 is a sectional elevational view taken along line 2—2 of FIG. 1.

FIG. 3 is a perspective elevational view of a second embodiment of the disclosed spherical vehicle, with portions removed for clarity.

FIG. 9 is a perspective view of a sixth embodiment of the disclosed spherical vehicle.

SUMMARY OF THE INVENTION

Figure 4:
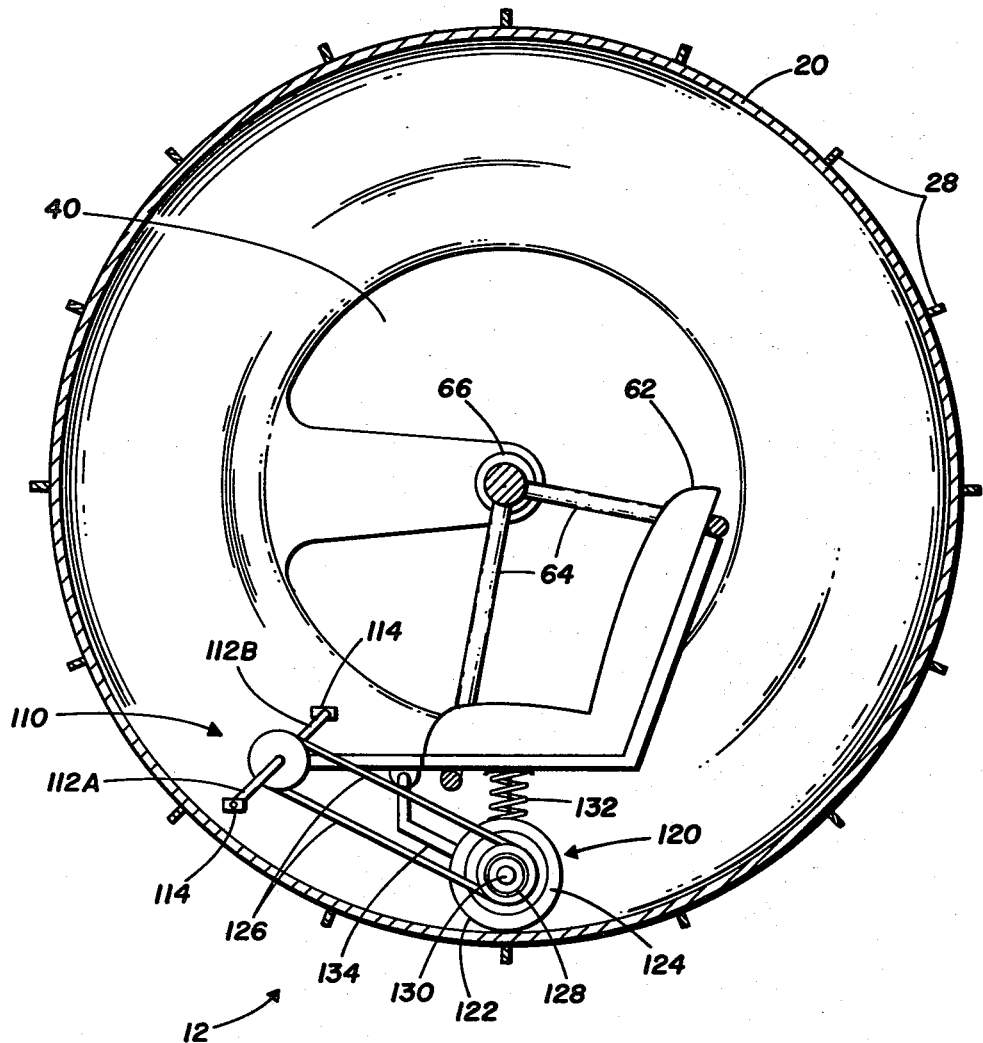
FIG. 4 is a sectional elevational view taken along line 4—4 of FIG. 3.

In accordance with one embodiment of this invention, it is an object to provide a spherical vehicle useful for transporting an occupant over various media.

It is another object to provide a spherical vehicle in which an occupant can be comfortably seated.

It is a further object to provide a spherical vehicle having a pedes apparatus to permit a seated occupant to propel the vehicle with his feet.

It is another object to provide a spherical vehicle having a propulsion apparatus which permits a seated occupant to brake the vehicle.

It is yet a further object to provide a spherical vehicle having separable hemispherical portions to permit an occupant entry into the vehicle.

It is still a further object to provide a spherical vehicle having unobstructed entry ports symetrically disposed about the axis of rotation of the vehicle.

It is again a further object to provide a spherical vehicle having a pedes surface controlled drive drivably communicating with the interior surface of an entry port symmetrically disposed about the axis of rotation of the vehicle.

It is an object to provide a spherical vehicle having a free floating carriage within a spherical member and also having alignment bars to maintain the longitudinal axis of the carriage generally orthogonal relative to the axis of rotation of the shell member.

DESCRIPTION OF THE PREFERRED EMBODIMENTS

In accordance with one embodiment of this invention, a vehicle for transporting at least one person over a supporting medium is disclosed, comprising: shell means having a rotatable shell member provided with an axis of rotation for controllably movably spacing the person from the medium; carriage means having at least a seat in rotatable communication with the shell member for suspending the person about the axis of rotation of the shell member; observation means in at least partial communication with the shell member for permitting the person to observe at least a forward view; and treading means in at least partial communication with the interior of the shell member having at least a pedes contact surface for controllably rotating the shell member.

In accordance with another embodiment of this invention, a method for transporting a person over a medium is disclosed, comprising the steps of: providing a shell member having an axis of rotation; rotatably suspending a seat within the shell member about the axis of rotation; providing an observation apparatus coupled to the shell member to permit the occupant to perceive at least a prospective path of motion; and rotating the shell member with an application of manual power.

The foregoing and other objects, features and advantages will be apparent from the following, more particular, description of the preferred embodiment of the invention, as illustrated in the accompanying drawings.

Referring to FIG. 1, a perspective view of a first embodiment of a spherical vehicle for carrying at least one person is shown generally by reference number 10. The first embodiment 10 is provided with: shell means, for example a shell member 20 having a normal axis of rotation, for controllably movably spacing a person from a supporting surface or medium; carriage means as shown generally by reference number 60, for rotatably suspending the person about the same axis of rotation; observation means, as shown generally by reference number 80; and treading means for controllably rotating the shell member 20. The shell member 20 is provided with a generally arcuate external surface, which can be either spherical or ellipsoidal, and which at rest contacts the supporting medium with a nominal point of tangency. The shell means are further comprised of entry means for permitting the person to enter and leave the vehicle 10. The treading means are comprised of at least a pedes surface, for permitting motive power to be applied with at least a foot of the person in the vehicle 10, driver means for controllably accelerating the shell member 20 about the axis of rotation along a path of motion, and brake means for controllably decelerating the shell member 20 about the axis of rotation. Motion in the desired direction of travel is achieved by displacing the cumulative center of gravity of the carriage means and the occupant toward the desired direction of travel in the longitudinal plane of symmetry, thereby tending to rotate the shell member 20 to return the nominal point of tangency to a plumb under the cumulative center of gravity. The shell member 20 has a generally convex exterior surface, to permit the shell member 20 to rotate freely upon and/or over the supporting medium. When travelling the vehicle 10 can be steered by the shifting of the occupant's weight from the longitudinal plane of symmetry in the direction the occupant wishes to turn.

In the first embodiment, the shell means are further provided with inflatable cushion means for cushioning contact of the vehicle 10 with the supporting medium. As shown, the inflatable cushion means are comprised of inflatable impermeable membrane 22, which is peripherally sealed to the shell member 20 to form a cavity 21, and provided with a filler valve 24 to permit convenient pressurization of the cavity 21 with an external pressure source. The entry means of the first embodiment 10 are comprised of a pair of entry ports, a first of which is shown by reference number 40 (refer also to FIG. 2). The entry ports 40 are generally disposed about the axis of rotation of the shell member 20, and are sufficiently sized to allow a person to slide in or out of the shell member 20.

Referring further to the first embodiment 10, the carriage means are shown provided with a seat 62, a seat support member or axle 64, and a plurality of bearings 66, a first of which is shown as by reference number 66 (refer also to FIG. 2), for rotatably coupling the axle 64 to the shell member 20. The shell member 20 is provided with a corresponding plurality of structurally adequate support members 26 which each couple one of the bearing 66 to the shell member 20. As the shell 20 rotates with respect to the supporting medium, the bearings 66 permit the axle 64 and the seat 62 to rotate within the shell, and thereby maintain a plumb condition, so that the person can remain seated upon the seat 62 as the shell member 20 rotates and the vehicle 10 translates upon the supporting medium.

In the first embodiment 10, the observation means incorporate periscope means for permitting the person in the seat 62 to perceive obliquely transmitted images of at least a forward view. As shown in the first embodiment 10, the periscope means comprise an axial periscope having corresponding pairs of cooperativily aligned internal mirrors 82 and an external mirrors 84, which mirrors 82, 84 can be selectively aligned to establish an oblique line of sight, as shown by reference numbers 86A, 86B and 86C. It can be seen that the second portion 86B of the line of sight is coincidental with the axis of rotation of its shell number 20. While the mirrors 82, 84 as shown provide a forward directed line of sight 86C, it will be apparent to one skilled in the art that at least one of the external mirrors 84 could be realigned to also provide a rearward directed line of sight. The axial periscope of the first embodiment 10 is also provided with at least a periscope tube, a first one of which is shown by reference number 88, concentrically disposed about the axis of rotation of the shell member 20. The periscope tube 88 forms the portion of the axle 64 which contacts the bearing 66. Furthermore, the external mirror 84 is coupled to the periscope tube 88 and functions cooperatively with an internal aperture 90 of the periscope tube 88 to permit the line of sight 86B to be transmitted between mirrors 82 and 84 without regard to the rotational orientation of the shell member 20.

Referring also to FIG. 2, a sectional elevational view taken along line 2—2 of FIG. 1 is shown. The driver means of the first embodiment 10 are shown as a friction surface 100, which is the pedes surface, in communication with the internal surface of the shell member 20 and is equally disposed about the plane of longitudinal symmetry of the shell member 20, so that the person in the seat 62 can rotate the shell member 20, forward or backward, by sequentially engaging the friction surface 100 with the feet in a treadmill manner. The brake means of the first embodiment 10 are also comprised of the friction surface 100. The person in the seat 62 can decelerate the shell member 20 by engaging the pedes surface with the feet and slowing the shell member 20 with an application of power through the legs.

Referring to FIG. 3, a second embodiment of a spherical vehicle, which is particularly well adapted to use in the water, is shown generally by reference number 12. Identical reference numbers are used to refer to features in common with the first embodiment 10. In the second embodiment, the observation means 80 incorporates periscope means which are comprised of a non-axial periscope having at least one of each of the internal mirror 82 and the external mirror 84. The mirrors 82, 84 can be selectively aligned to establish oblique lines of sight as shown by the reference numbers 86A, 86B and 86C. In contrast to the first embodiment 10, it can be seen that each of the second portions 86B of the lines of sight is not coincidental with the axis of rotation of the shell member 20. However, a substantially continuous image is transmitted to the person in the seat 62 by disposing the mirrors 82 and 84 such that each of the portions 86B of the lines of sight is transmitted through the entry port 40. Each of the portions 86B of the lines of sight are then only interrupted as one of the support member 26 rotates through and past that second portion 86B of the lines of sight. Furthermore, by coupling the respective support members 26 to diametrically opposed portions of the shell member 20, and aligning both sets of mirrors 82, 84 to provide a forward looking view, a continuity of line of sight is provided in that only one of the second portions 86B of the lines of sight is interrupted by a support member 26 at any one time by the passage of the support member 26.

As shown, the shell means of the second embodiment 12 are inherently provided with flotation means for displacing a volume of water when the vehicle 12 is placed in water so that the vehicle 12 will float. The inherent flotation means are comprised of a geometric limitation upon a radial dimension of each of the entry ports 40, as measured from the axis of rotation of the shell member 20, wherein the mass of a volume of water equal to the volume enclosed by the external surface of shell member below a horizontal plane defined by the lower limits of the entry port 40 as defined by the geometric limitation is greater than the total mass of the person and the vehicle 12.

The shell means of the second embodiment 12 are further provided with traction means, as for example, a plurality of paddles 28, for minimizing and preventing slippage between the external surface of the shell member 20 and the supporting medium. Such traction means are particularly useful where the supporting medium is less than firm, as for example, where the supporting medium is snow or water.

Referring to FIG. 4, a sectional elevational view taken along line 4—4 of FIG. 3 is shown. The driver means of the second embodiment 12 are shown as: a pedal means having an axis of rotation and shown generally by reference number 110, for rotatably communicating with the feet of the person in the seat 62; a drive wheel 120 rotatably coupled to the carriage means; and linkage means for transferring the rotary motion of the pedal means to the drive wheel. The drive wheel 120 is provided with a drive surface 122 biased against the interior surface of the shell member 20. The loading means can be the drive wheel 120 having a variably inflatable tire 124 so that varying the pressure within the tire 124 alters the bias, or alternatively be comprised of a spring suspension connecting the drive wheel 120 to the carriage means. The spring suspension is shown as a spring member 132 rotatably coupled to the wheel 120 and pivotally coupled to the seat support member 64, and an arm member 134 rotatably coupled to the wheel 120 and pivotally coupled to the seat support member 64 so that the wheel 120 is biased against the interior surface of the shell member 20.

The pedal means 110 are provided with a pair of pedal arms 112A, 112B and a pedal 114 coupled to an end of each of the pedal arms 112A and 112B. Each of which pedals 114 comprise one of the pedes surfaces. The linkage means are advantageously comprised of a roller chain 126 and the drive wheel 120 is preferably provided with a freewheeling hub 128 and a coaster brake 130 so that when the rotation of the pedal arms 112A, 112B is stopped, the shell member 20 is free to continue to rotate, and when the rotation of the pedal arms 112, 112B is reversed, the coaster brake 130 controllably decelerates the shell member 20.

Figure 5:
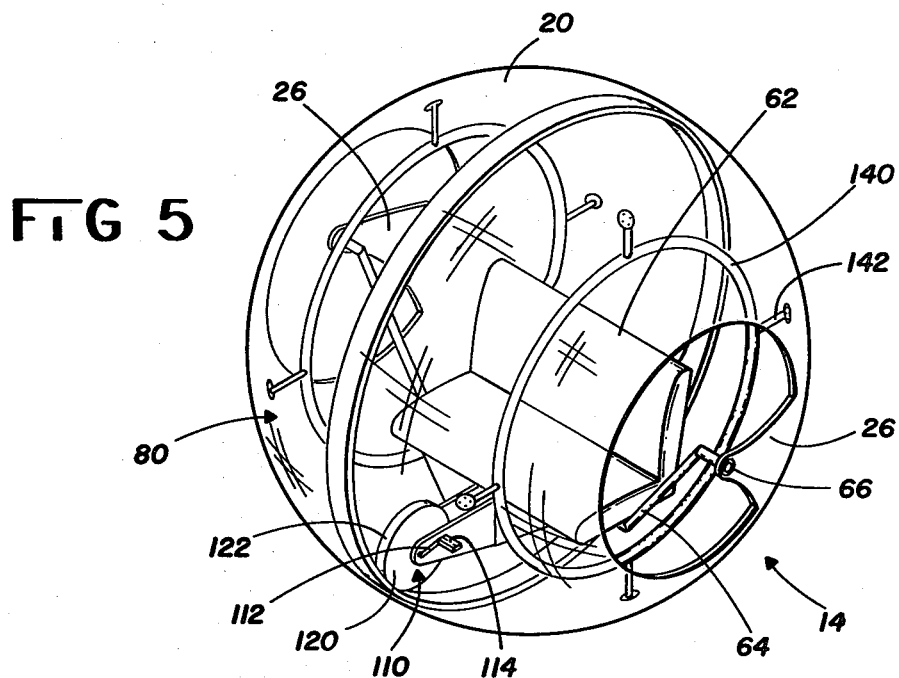
FIG. 5 is a perspective elevational view of a third embodiment of the disclosed spherical vehicle.

Referring to FIG. 5, a perspective view of a third embodiment of a spherical vehicle is shown generally by reference number 14. Common features are identified with reference numbers as used for the first and second embodiments 10, 12. In the third embodiment 14, the observation means 80 are comprised of a transparent shell member 20. The transparent shell member 20 can be advantageously fabricated from, for example, clear acrylic plastic. The driver means of the third embodiment 14 are also comprised of the pedal means 110 and the drive wheel 120. The drive wheel 120 and the pedal means are disposed about a common axis and rotatably coupled to the seat support member 64. The driver means are further comprised of a pair of handrails 140 coupled by stanchions 142 to the interior of the spherical member 20 so that a person in the seat 62 can propel the vehicle 14 with a hand over hand motion applied to the pair of handrails.

Figure 6:
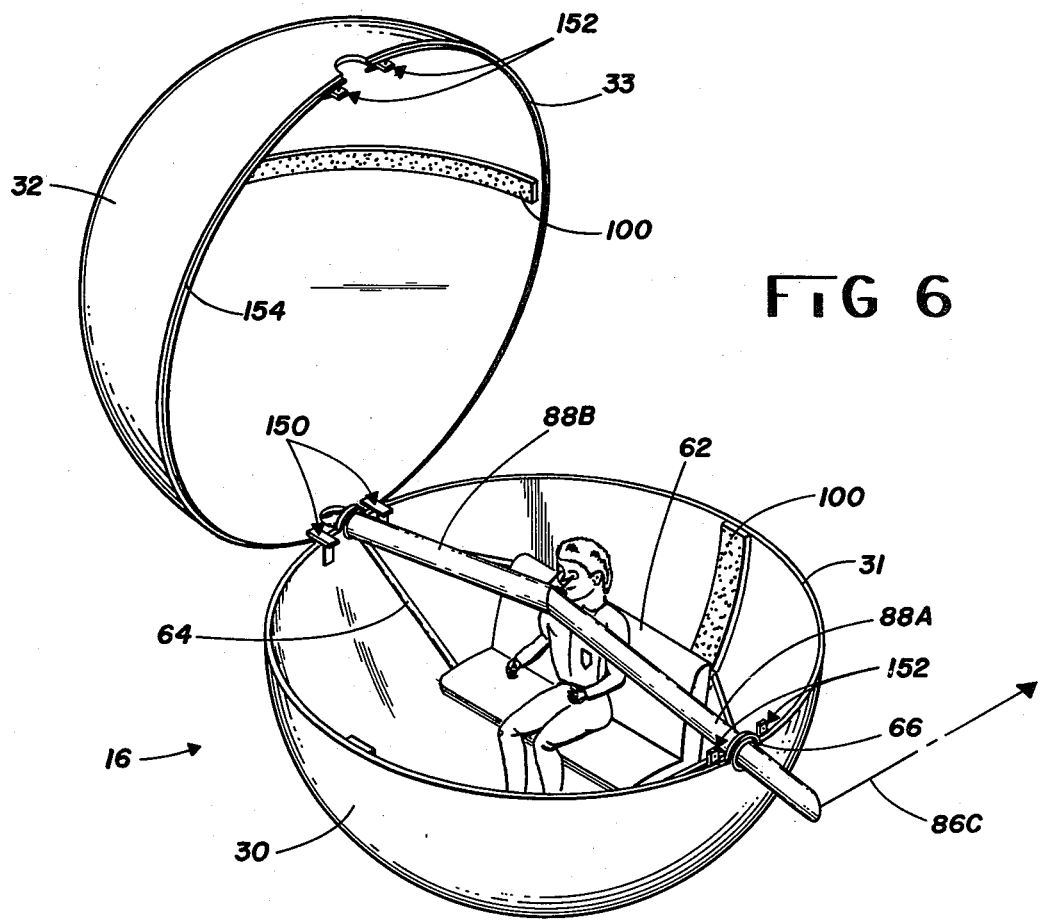
FIG. 6 is a perspective elevational view of a fourth embodiment of the disclosed spherical vehicle.

Referring to FIG. 6, a perspective view of a fourth embodiment of a spherical vehicle is shown generally by reference number 16. Common features are identified with reference numbers as used to refer to the first, second and third embodiments 10, 12 and 14. The entry means of the fourth embodiment are comprised of the shell member 20 having first and second hemispherical portions 30, 32, and further comprised of coupling means for releasably coupling the first 30 and second 32 hemispherical members. The hemispherical members 30, 32 are respectively provided with first and second annular contact surfaces 31, 33, which surfaces 31, 33 comprise the mating surfaces of the shell member 20 hemispherical portions 30, 32. The coupling means are comprised of hinge means shown generally by reference number 150 for hingedly connecting the first and second hemispherical members 30, 32. The coupling means are further comprised of latch means shown generally by reference number 152 for permitting a person in the vehicle 16 to secure the first and second contact surfaces 31, 33 in communication. The latch means 152 can be any of a number of well known devices, for example, a hook and eye apparatus. To permit the vehicle 16 to enter a body of water and remain afloat, the coupling means are preferably further comprised of seal means for sealing the first and second contact surfaces 30 and 31 when the latch means are engaged. The seal means are advantageously comprised of a neoprene bead 154 coupled to one of the contact surfaces 31, 33, and having continuous communication with both of the contact surfaces 31, 33 when the latch means are engaged so that the water tight seal is formed.

The observation means of the fourth embodiment 14 are also comprised of periscope means. As shown in the fourth embodiment 14 the periscope means are provided with first and second periscope tubes 88A, 88B, which are commonly coupled generally directly in front of the eyes of the person seated in the seat 62. The tubes 88A, 88B are further each coupled to one of the bearings 66, and are each provided with the internal and external mirrors (not shown) as in the first embodiment 10. As the tubes 88A, 88B are coupled to the seat support member 64 proximal to the bearing 66, and define an internal passage which concentrically passes through the interior of the bearings 66, the shell member 20 is free to rotate without interference with either the interior or exterior portions of the periscope tubes 88A, 88B. As in the first embodiment 10, the external mirrors (not shown) are alignable to provide either forward looking or rearward looking view.

Figure 7:
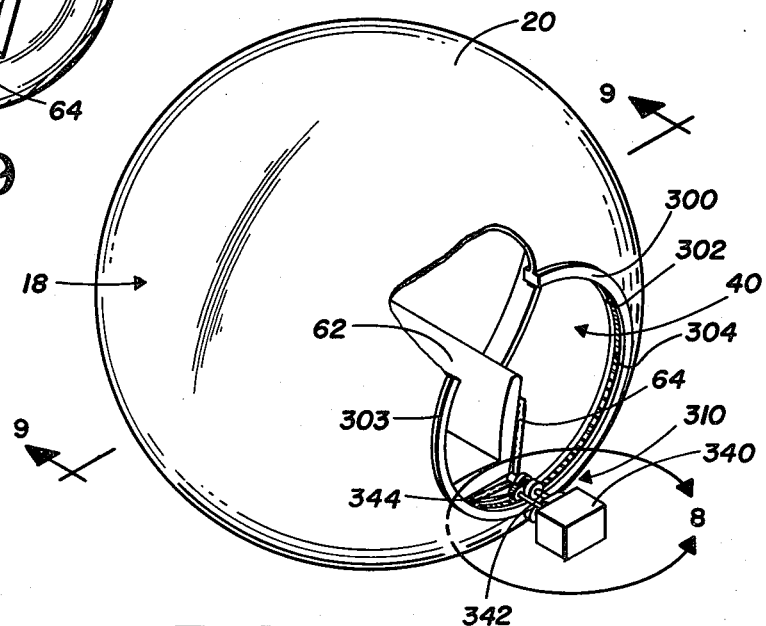
FIG. 7 is perspective view of a fifth embodiment of the disclosed spherical vehicle.

Referring to FIG. 7, a perspective view of a fifth embodiment of a spherical vehicle is shown generally by reference number 18. Common features are identified with reference numbers as used to refer to the first, second, third and fourth embodiments 10, 12, 14 and 16 (with the observation means being omitted for clarity). The fifth embodiment 18 utilizes a pair of rail members 300, of which only one is shown, which rail member 300 is concentrically formed about the entry port 40 as a portion of the shell member 20. Trolley means for rotatably supporting the seat 62 upon the rail members 300 are shown generally by reference number 310. The rail members 300 are also provided with a driven gear 304 which comprises a portion of the treading means concentrically disposed about the axis of rotation and which is coupled to an inner surface 302 of the rail member 300.

Figure 8:
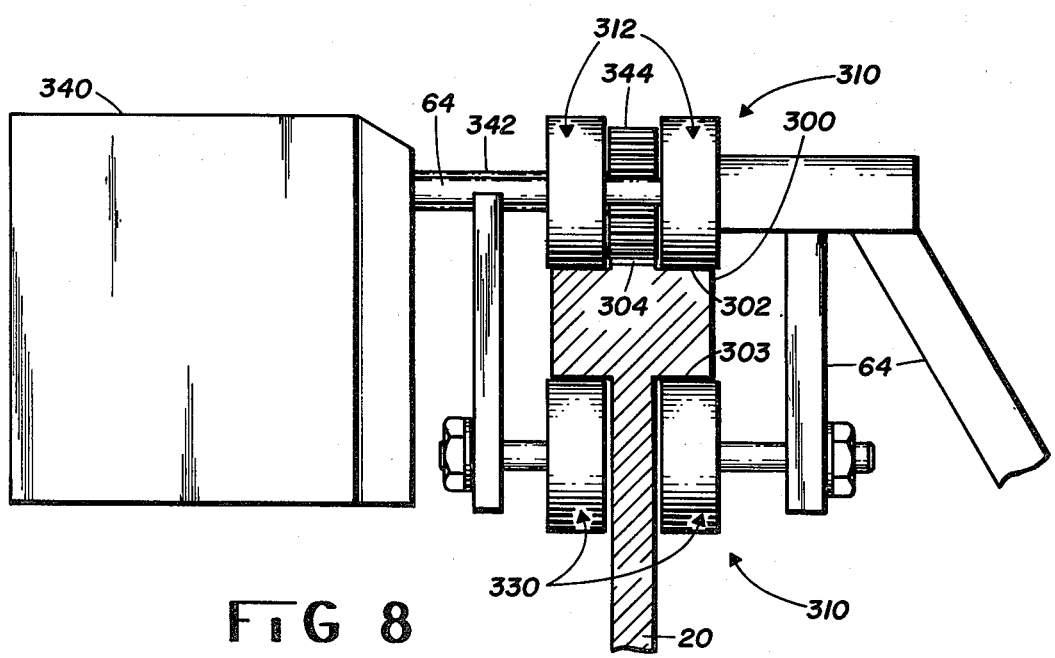
FIG. 8 is an enlarged sectional view referenced from numeral 8.

Referring additionally to FIG. 8, a sectional detail referenced from numeral 8 of FIG. 7, the treading means are shown as being further comprised of an engine 340, which being of a well known type is illustrated as a box. The engine 340 is mounted outboard of the entry port 40 and is coupled to the seat support member 64 in a fixed rotational relationship. Although only a first engine 340 is shown, the vehicle 18 is preferably provided with a second engine 340 coupled to the seat support member 64 in a symmetric position with respect to the first engine 340 so that the vehicle 18 is in a balanced condition at rest. A rotatable output shaft 342 extends from the engine 340, and terminates in a driver gear 344. The driver gear 344 is drivably coupled to the driven gear 304 in a manner so that rotation of the output shaft 342 by the engine 340 causes the seat support member 64 to rotate with respect to the driven gear 304, and hence with respect to the shell member 20, thereby moving the vehicle 18 in the desired direction of travel.

The trolley means are provided with at least a support wheel 312, of which a pair are shown. The support wheels 312 are rotatably coupled to the seat support member 64, and have the support wheel 312 rotating surface in communication with the inner surface 302 of the rail member 300. The trolley means are additionally comprised of at least a cam follower 330, of which two are shown, rotatably coupled to the seat support member 64 and having the cam follower 330 rotating surface in communication with an outer surface 303 of the rail member 300 so that the support wheels 312 are kept in contact with the surface outer surface 303 of the rail member 300 even when gravity tends to move the support wheels 312 away from the inner surface 302.

Figure 9:
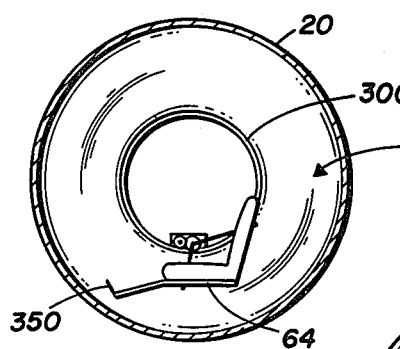
FIG. 9 is a sectional elevational view taken along line 9—9 of FIG. 7.

Referring to FIG. 9, a sectional elevational view taken along line 9—9 of FIG. 7 is shown. The treading means are shown further comprising a throttle means, provided with the pedes surface 350, for permitting a person to controllably operate the engine means. As the throttle linkage is of a well known type, only the throttle pedal provided with the pedes surface 350 is shown.

Figure 10:
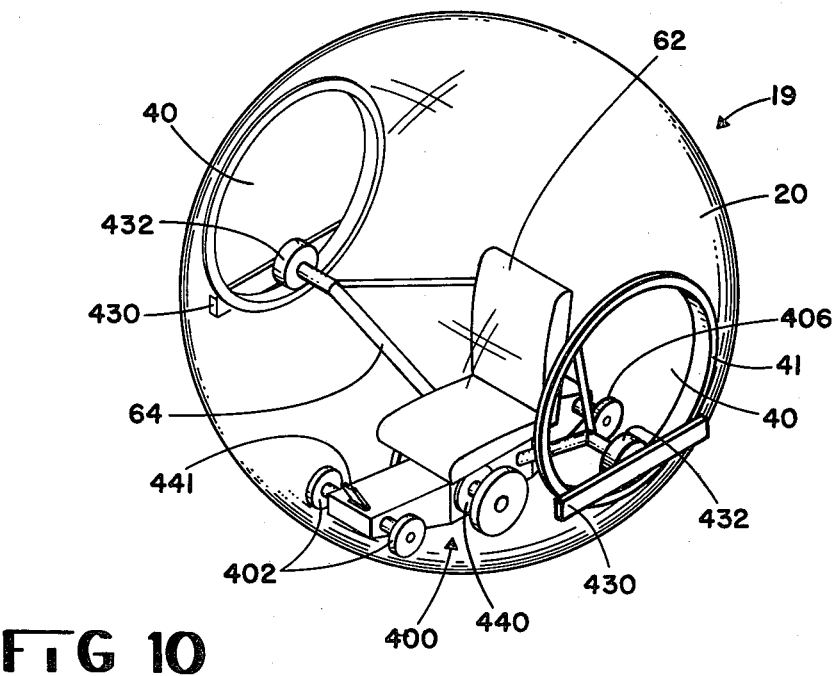
FIG. 10 is a perspective view of an alternate variation of the sixth embodiment.

Referring then to FIG. 10, a perspective view of a sixth embodiment of a spherical vehicle is shown generally by reference number 19. The shell member 20 of the sixth embodiment 19 is shown, for clarity, as a clear member having first and second entry ports 40. The first and second entry ports 40 are each defined by a bearing surface 41. The seat 62 and the seat frame 64 are supported by a subframe, shown generally by reference number 400. The subframe 400 is provided with a plurality of wheels, rotatably coupled to the subframe 400 and riding upon the interior of the shell 20. The plurality of wheels preferably includes a pair of leading wheels 402, a pair of driver wheels 404 mounted rearward from the leading wheels 402, and a pair of trailer wheels 406 mounted rearward from the driver wheels 404. The collective center of gravity of the seat 62, the frame and an occupant (when present) is preferably, at least at rest, approximately plumb above the driver wheels 404. In this manner, a shift of the collective center of gravity, caused for example by acceleration or deceleration of the shell 20 merely redistributes the load of the collective center of gravity over a combination of the leading wheels 402 and the driver wheels 404, or the driver wheels 404 and the trailing wheels 406.

The sixth embodiment 19 is also provided with alignment means coupled to the seat frame 64 for maintaining the axis of rotation of each of the wheels 402, 404 and 406 generally parallel to the axis of rotation of the shell 20. The alignment means are provided with first and second alignment bars 430, fixedly coupled to the seat frame 64 and having at least intermittent slidable communication with the bearing surface 41. In operation, the carriage means free floats within the shell 20, but is maintained in a proper alignment by the alignment bars 430, which generally prevent the longitudinal axis of the subframe 400 from leaving the plane of symmetry of the shell 20 perpendicular to the axis of rotation of the shell 20. In this manner, the carriage means is prevented from tending to "twist" within the shell 20 and from tending to "walk" toward the inlet port 40. The alignment means are also preferably provided with first and second idler wheels 432, rotatably coupled to the seat frame 64, which ride upon the interior surface of the entry ports 40. The idler wheels 432 prevent the carriage means 400, and the seat 62, from tipping when the collective center of gravity is shifted from side to side. In this manner, the idler wheels 432 also facilitate steering by permitting the occupant to tilt the axis of rotation of the shell 20.

The sixth embodiment 19 is further comprised of a battery powered electrical motor 440 of a well known type. The motor 440 is mounted within the carriage means 400, and is drivably coupled to the driver wheels 404. The electrical motor 440 is controlled by a pedal, having a pedes surface 441, coupled to the carriage means 400.

Figure 11:
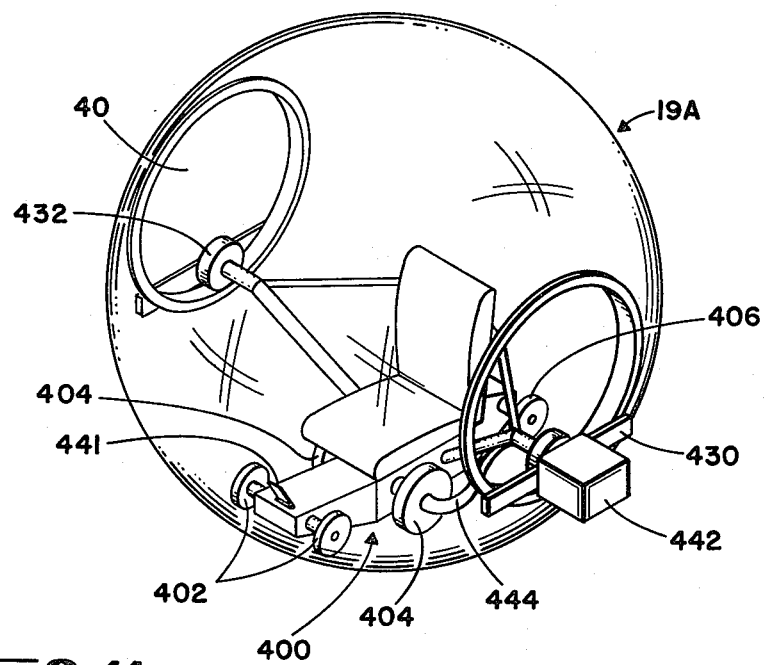
FIG. 11 is a view similar to FIG. 10 showing another variation of the sixth embodiment.

Referring to FIG. 11, a variation of the sixth embodiment 19 is shown generally by reference number 19A. In variation 19A, an electrical motor 442 is supportively coupled to the alignment bar 430, and is drivably coupled to the driver wheels 404 by a flexible drive 444.

While the invention has been particularly shown and described with reference to preferred embodiments thereof, it will be understood by those skilled in the art that the foregoing and other changes in form and details may be made therein without departing from the spirit and scope of the invention.

I claim:
1. A vehicle comprising:
a transparent, substantially rigid shell in the general shape of a sphere, said shell having circular ports with bearing surfaces along the edges thereof, the centers of said ports being on opposite ends of a diameter of said shell;
a carriage adapted to seat a person, said carriage having a pair of drive wheels with rims directly engaging and rotatable over the interior surface of said shell;
a pair of idler wheels having respective rims that are rotatably maintained upon said bearing surface;
a pair of support members, coupled to said carriage and to said idler wheels, that maintain said carriage substantially equidistant from said idler wheels; and
means for providing power to said drive wheels.

* * * * *